Patented July 26, 1932

1,868,715

UNITED STATES PATENT OFFICE

PAUL MOCHALLE, OF DURRJENTSCH, AND JACOB MROCHEM, OF BRESLAU, GERMANY

CONCENTRATED SULPHUR SUSPENSION AND PROCESS OF MAKING SAME

No Drawing. Application filed September 23, 1930, Serial No. 483,968, and in Germany September 30, 1929.

This invention relates to a novel concentrated sulphur suspension and a process of making same.

It is known to heat mixtures of sulphur and sugar up to the melting point and to float-up the molten mass after having cooled off in water, whereby after filtration finely distributed sulphur will be obtained developing at the same time sulphuretted hydrogen.

We have found that if sulphur is heated with sugar and starch up to at least 160° C. in the presence of air after having floated-up the molten mass in water, there will be separated substances which are colloidally soluble in pure water. An example of carrying out the process forming part of our invention is given in the following:

Example 1 kg. of sulphur is intimately mixed with 4 kg. of sugar and 1 kg. of starch flour and heated within a container of refractory material in a moderate fire, at the same time introducing air into the container. Introduction of air is necessary in order to avoid the formation of sulphuretted carbon.

At 160° the molten mass is taken off the fire and after having slightly cooled off poured onto plates to permit full cooling. The so-obtained cooled mass is now crushed into small pieces and floated-up in 30 l. of water, the substances which are colloidally soluble in water now depositing so that they may be separated from the aqueous liquid and dried.

The preparations made according to this process contain, besides large quantities of colloidal sulphur, highly molecular sulphur-containing organic compounds which are of oily consistency and soluble in water.

These oils are of reddish-brown color and are almost completely soluble in water and 90% alcohol. Their aqueous solution reacts acid against phenol phthalein and litmus and neutral against methyl orange.

It has been found that the oils so obtained consist of a mixture of several sulphur-containing organic compounds which may be separated from each other by a process of distillation in the vacuum. However, a large part of these oils is not volatile and cannot be distilled nor de-composed at a higher temperature.

The distillates are from yellowish-brown to dark-red oily liquids which themselves again represent mixtures and it has been possible to separate from these mixtures small quantities of crystallizing compounds.

By distilling these oils in the vacuum there had been obtained, after drying, the following substances:

*First fraction.*—There will be separated the component having a boiling point up to 27° C. at a pressure of 14 mm. This component amounts to about 2 percent of the oil and consists of a sirup-like yellowish-brown substance from which after some longer standing needle-shaped crystals will separate.

*Second fraction.*—There will be separated the component having a boiling point at from 28° to 33° C. at a pressure of 14 mm. This component amounts to about 18% of the oil and consists of a clear yellow, easily movable liquid with a content of sulphur amounting to 0.73 percent.

*Third fraction.*—There will be separated the component having a boiling point at from 34° to 170° C. at a pressure of 14 mm., while the main part of these oils has a boiling point at from 145° to 170°. This component amounts to about 40 percent of the oil and consists of a dark-red oily liquid from which after some standing small quantities of solid bodies will separate. The content of sulphur amounts to 1.02 percent.

*Fourth fraction.*—There will be separated the component which amounts to about 4% of the oil, this component having its boiling point at temperature above 170° at a pressure of 14 mm. This component of a reddish-brown sirup-like oil with a content of sulphur amounting to about 1.02 percent.

The residue after the fourth fraction amounts to about 36% of the oil and is of solid consistency, of black color and carbonaceous due to de-composition, the greater part of the residue being de-composed. The content of sulphur amounts to 2.1 percent.

The preparations so obtained do not develop any sulphuretted hydrogen and may be used for therapeutic or technical purposes.

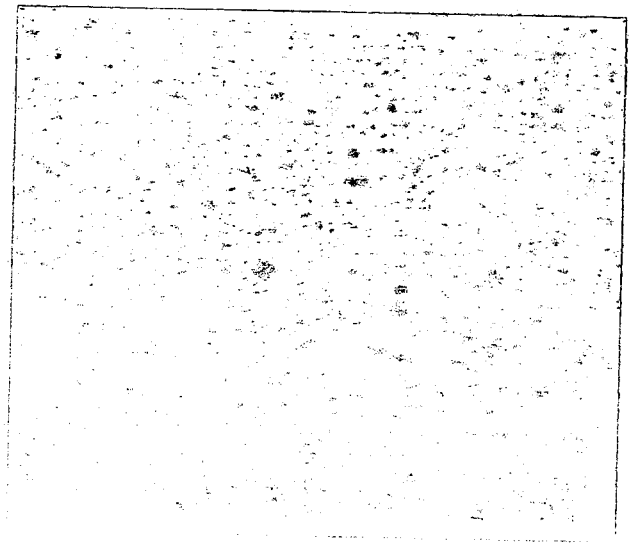

We claim:

1. A process of making a concentrated sulphur suspension able to produce colloidal solutions with water, said process consisting in melting sulphur together with sugar and starch in the presence of air at a temperature of at least 160° C., and thereupon cooling the molten mass so obtained.

2. A process of making a concentrated sulphur suspension able to produce colloidal solutions with water, said process consisting in melting sulphur together with sugar and starch in the presence of air at a temperature of at least 160° C., thereupon cooling the molten mass, floating up the solid mass so obtained in water, and separating from the resulting liquid the colloidally soluble substance.

3. A process of making a concentrated sulphur suspension able to produce colloidal solutions with water, said process consisting in melting sulphur together with sugar and starch in the presence of air at a temperature of at least 160° C., thereupon cooling the molten mass, floating up the solid mass so obtained in water, separating from the resulting liquid the colloidally soluble substances, and drying said colloidally soluble substances.

4. As a new product of manufacture, a concentrated organic sulphur suspension of oily consistency composed of sulphur, sugar and starch treated at a temperature of at least 160° C.

In testimony whereof we affix our signatures.

PAUL MOCHALLE.
JACOB MROCHEM.